(12) United States Patent
Hsu (10) Patent No.: US 11,986,013 B2
(45) Date of Patent: May 21, 2024

(54) PAPER HOOKAH HOSE

(71) Applicant: Yu-Ting Hsu, Taipei (TW)

(72) Inventor: Yu-Ting Hsu, Taipei (TW)

(\*) Notice: Subject to any disclaimer, the term of this patent is extended or adjusted under 35 U.S.C. 154(b) by 330 days.

(21) Appl. No.: 17/244,917

(22) Filed: Apr. 29, 2021

(65) Prior Publication Data
US 2021/0345662 A1 Nov. 11, 2021

(30) Foreign Application Priority Data

May 8, 2020 (TW) ................................ 109205567

(51) Int. Cl.
| | |
|---|---|
| *A24F 1/30* | (2006.01) |
| *A24F 1/32* | (2006.01) |
| *A24F 7/00* | (2006.01) |
| *D21H 11/14* | (2006.01) |
| *D21H 13/14* | (2006.01) |
| *D21H 17/67* | (2006.01) |
| *D21H 27/14* | (2006.01) |
| *D21H 27/34* | (2006.01) |
| *F16L 9/16* | (2006.01) |
| *F16L 55/027* | (2006.01) |

(52) U.S. Cl.
CPC ................. *A24F 1/30* (2013.01); *A24F 1/32* (2013.01); *A24F 7/00* (2013.01); *D21H 11/14* (2013.01); *D21H 13/14* (2013.01); *D21H 17/675* (2013.01); *D21H 27/14* (2013.01); *D21H 27/34* (2013.01); *F16L 9/16* (2013.01); *F16L 55/02772* (2013.01)

(58) Field of Classification Search
CPC ............ A24F 1/30; A24F 1/32; A47G 21/186
See application file for complete search history.

(56) References Cited

U.S. PATENT DOCUMENTS

| | | | |
|---|---|---|---|
| 3,025,004 A * | 3/1962 | Levi ........................ | B31F 1/205 239/33 |
| 2019/0069701 A1* | 3/2019 | O'Neill ................... | B31F 1/205 |
| 2020/0368990 A1* | 11/2020 | Horton ................. | A47G 21/186 |

\* cited by examiner

*Primary Examiner* — Eric Yaary
(74) *Attorney, Agent, or Firm* — Chun-Ming Shih; LANNWAY IPR SERVICES (57) ABSTRACT

A paper hookah hose includes a bendable tube, a smoking mouth and a connecting tube. The bendable tube is a tubular member made of paper and having at least two layers and a spiral structure. The bendable tube has a section of bellows for bending. The bendable tube may be a full bellows or a combination of a bellows and a straight tube. The smoking mouth and the connecting tube are completely made of traditional pulp.

8 Claims, 8 Drawing Sheets

PAPER HOOKAH HOSE

TECHNICAL FIELD

The invention relates to hookahs, particularly to a disposable hose for connecting a hookah.

RELATED ART

An Arabian hookah is a smoking instrument originating in India and is popular in Arabic region. For Arabians, smoking hookah is definitely a pleasant treat. Many Arabians have their own hookahs in different places. Some people carry silver tobacco holders with them for convenience.

An Arabic hookah uses Arabic fruit tobacco to make a smoker feel like smoking, but the toxins therein can be reduced to only a few percent of a cigarette because of the filtration of water. Because of its strong fragrance and extremely low nicotine content, hookah also attracts many female smokers, and is considered an elegant and charming fashion product. In Middle Eastern countries, from princes and nobles to traffickers and pawns, smoking hookah is a common pastime of local people. Smoking hookah is the most common social activity.

An Arabic hookah is composed of a body, a bowl, a hose and a mouth. An end of the hose is connected to the body and the other end of the hose is connected to the mouth. An elementary hookah has only one mouth. There is a kind of hookah for several people, which has a body capable of connecting several hoses. In some social places, people often share a single hookah. Because it is used by several people, due to hygiene issues, disposable mouths are usually used to prevent infectious diseases.

Due to hygiene and health issues, users in the Middle East use disposable hookah hoses. The hookah hose sold on the market includes a smoking tube, a mouth connected to one end of the smoking tube, and a connecting tube connected to the other end of the smoking tube. The connecting tube is used to connect the smoking kettle, and adopts a pluggable design. It can be used by only connecting the connecting tube to the kettle body. When replacing the hookah hose, just unplug the connecting tube and replace the whole hookah hose with a new one.

At present, the hookah hoses sold on the market are mainly plastic products. Compared with high-quality or artistic and ornamental hookah hoses, plastic hookah hoses are low in price. In the Middle East, a user usually replaced two hookah hoses in a single day. Because of the vast number of users, plastic hookah hoses will cause environmental problems that cannot be ignored.

SUMMARY OF THE INVENTION

An object of the invention is to provide a paper hookah hose, which is disposable, bendable and naturally decomposable.

To accomplish the above object, paper hookah hose includes a bendable tube, a smoking mouth and a connecting tube. The bendable tube is a tubular member made of paper and having at least two layers and a spiral structure. The bendable tube has a section of bellows for bending. The smoking mouth is made of traditional pulp, is a tubular member and is connected to an end of the bendable tube. The connecting tube is made of traditional pulp, is a tubular member and is connected to another end of the bendable tube.

Preferably, the bendable tube is a tubular member formed by a two-layer paper strip by means of spiral winding.

Preferably, the two-layer paper strip is made by two strips of raw paper which are overlapped, the two strips of raw paper are adhered by an adhesive to form the two-layer paper strip, and material of the raw paper is traditional pulp, recycled paper or stone paper.

Preferably, the bendable tube is a tubular member formed by a three-layer paper strip by means of spiral winding.

Preferably, the three-layer paper strip is made by three strips of raw paper which are overlapped, the two strips of raw paper are adhered by an adhesive to form the three-layer paper strip, and material of the raw paper is traditional pulp, recycled paper or stone paper.

Preferably, the bendable tube is completely of a bellows.

Preferably, the bendable tube comprises at least one section of the bellows and a section of straight tube connected to the bellows.

Preferably, a tail section of the smoking mouth and a tail section of the connecting tube are separately inserted into two ends of the bendable tube and are adhered to the bendable tube by an adhesive.

The paper hookah hose of the invention is completely made of paper. The bendable tube has at least two layers and is bendable. The invention can be mass produced and is environment-friendly.

DETAILED DESCRIPTION OF THE INVENTION

In the description, the positional relations including upper, lower, left and right are based on the direction of the figures if no particular indication.

Figure 1:
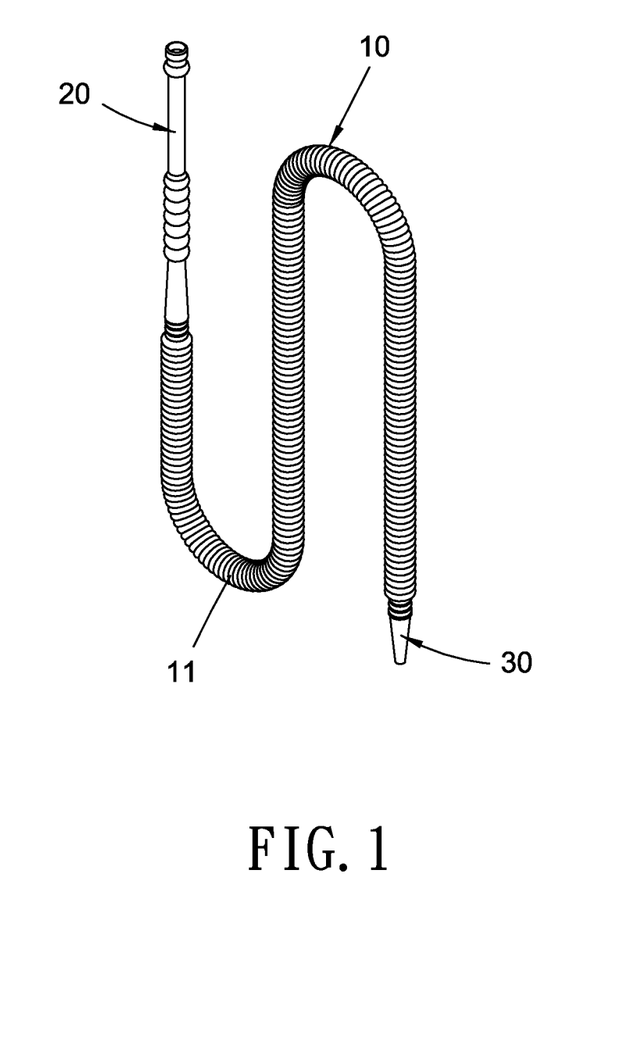
FIG. 1 is a schematic view of an embodiment of the invention.
Figure 2:
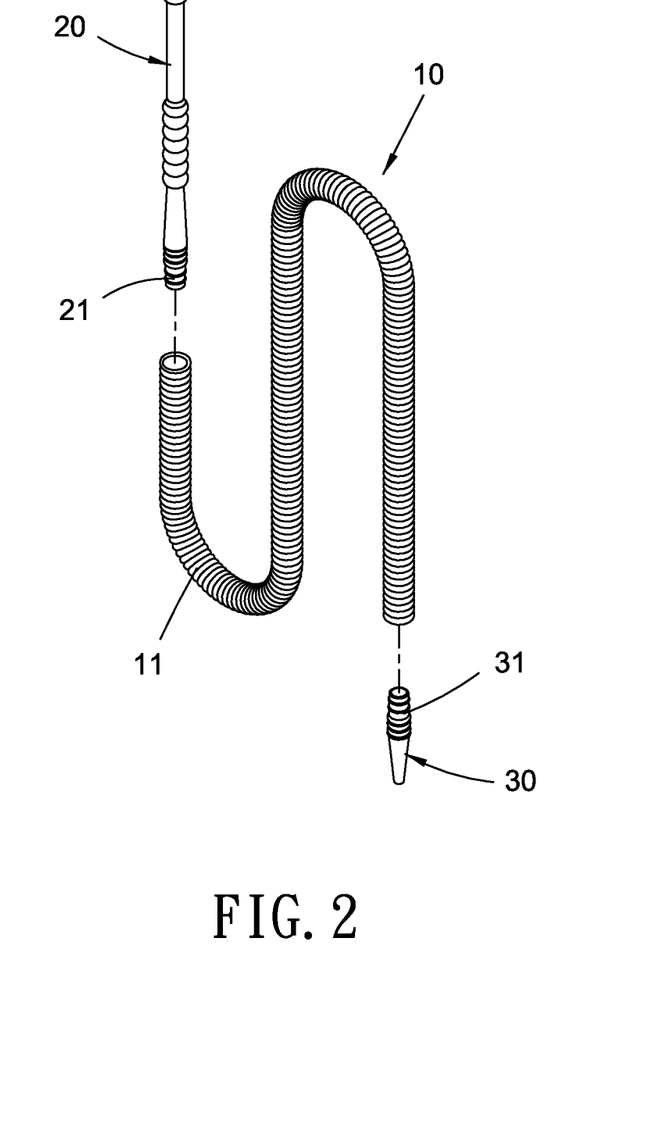
FIG. 2 is an exploded view of the embodiment shown in FIG. 1.

Please refer to FIGS. 1 and 2, which are a schematic view and an explode view of the paper hookah hose of the invention.

An embodiment of the paper hookah hose includes a bendable tube 10, a smoking mouth 20 connected to an end of the bendable tube 10 and a connecting tube 30 connected to the other end of the bendable tube 10. The bendable tube 10, the smoking mouth 20 and the connecting tube 30 are tubular members made of paper. The smoking mouth 20 and the connecting tube 30 are made of traditional pulp and by the molding process. After that, the smoking mouth 20 and the connecting tube 30 are separately connected to two ends of the paper bendable tube 10 to finish the paper hookah hose of the invention. Preferably, tail sections of the smoking mouth 20 and the connecting tube 30 are separately adhered to two ends of the bendable tube 10 by an adhesive. More preferably, a tail section 21 of the smoking mouth 20 and a tail section 31 of the connecting tube 30 are separately inserted into two ends of the bendable tube 10 first, and then are adhered to the bendable tube 10 by an adhesive.

In the embodiment shown in FIGS. 1 and 2, the bendable tube 10 is completely of a bellows. That is, the whole of the bendable tube 10 is a bendable bellows made by a dedicated machine or device.

Figure 3:
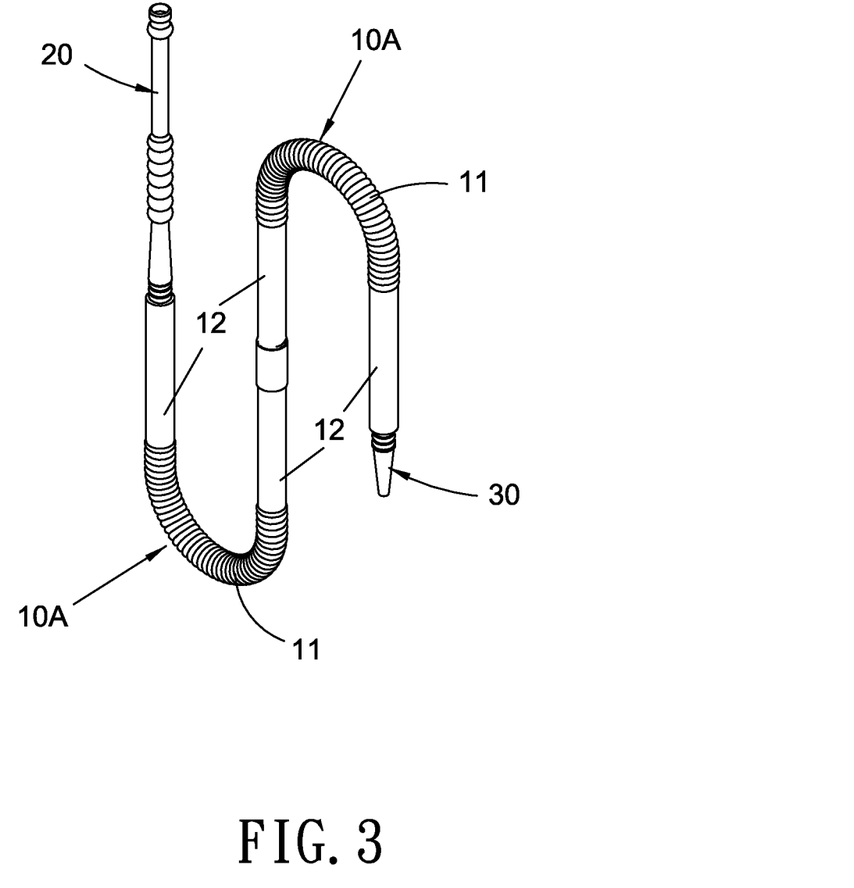
FIG. 3 is a schematic view of another embodiment of the invention.
Figure 4:
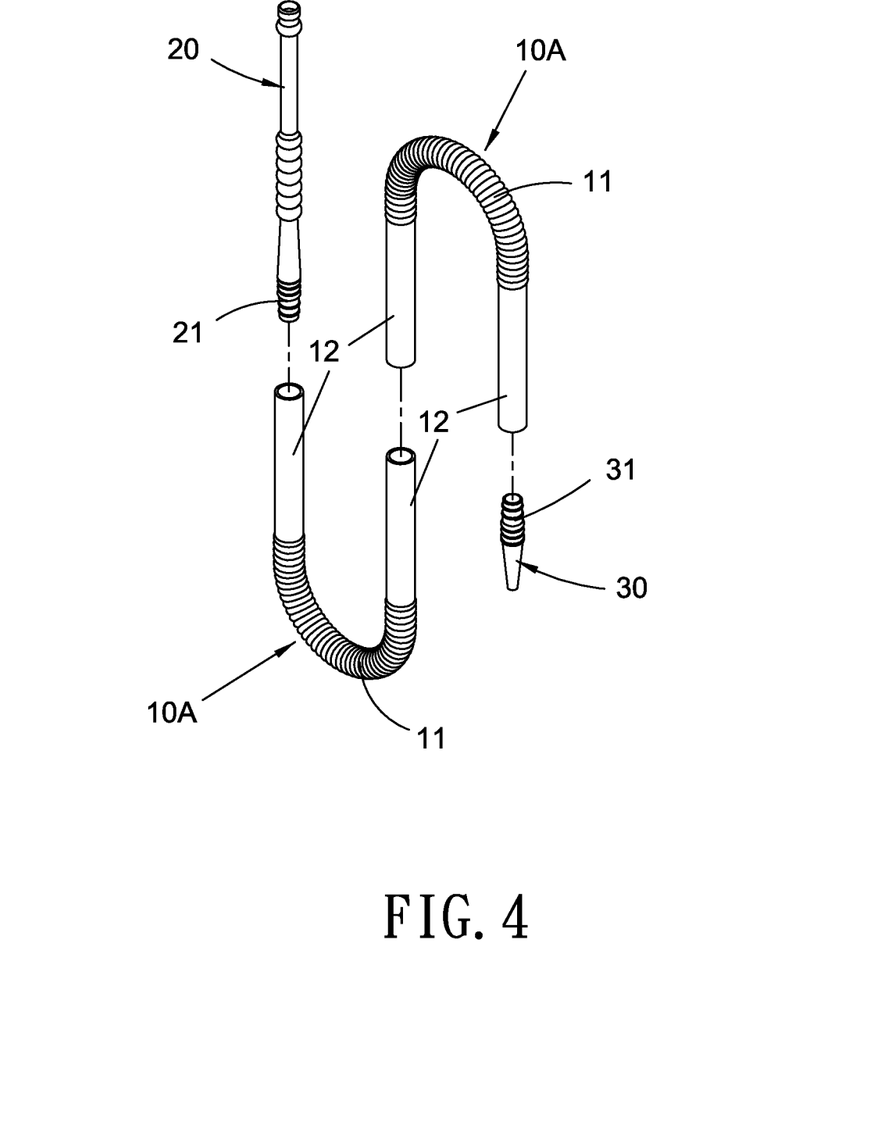
FIG. 4 is an exploded view of the embodiment shown in FIG. 3.

Please refer to FIGS. 3 and 4, which are a schematic view and an exploded view of another embodiment of the invention. In the embodiment, the bendable tube 10A includes at least one section of bellows 11 and a section of straight tube 12 connected with the bellows 11. Multiple bendable tubes 10A are connected to compose a bendable tube 10A which can bent at one or more positions.

Figure 5:
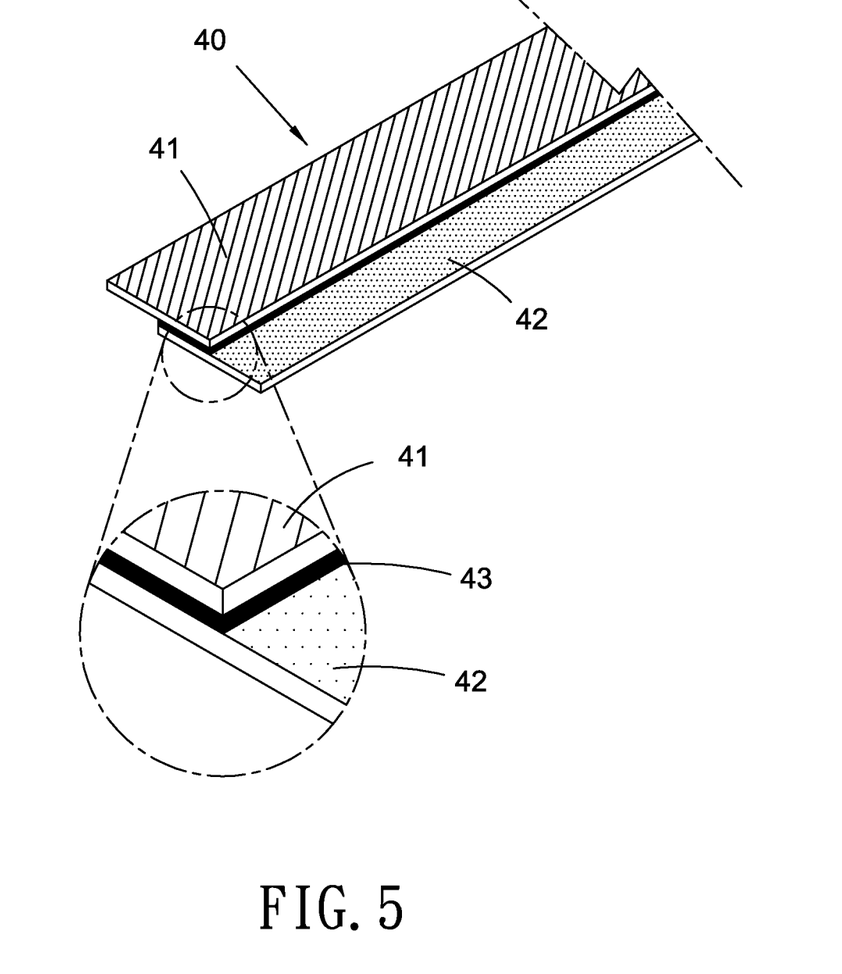
FIG. 5 is a partially schematic view of the invention, which shows the two-layer structure of the paper tube with a spiral structure.
Figure 7:
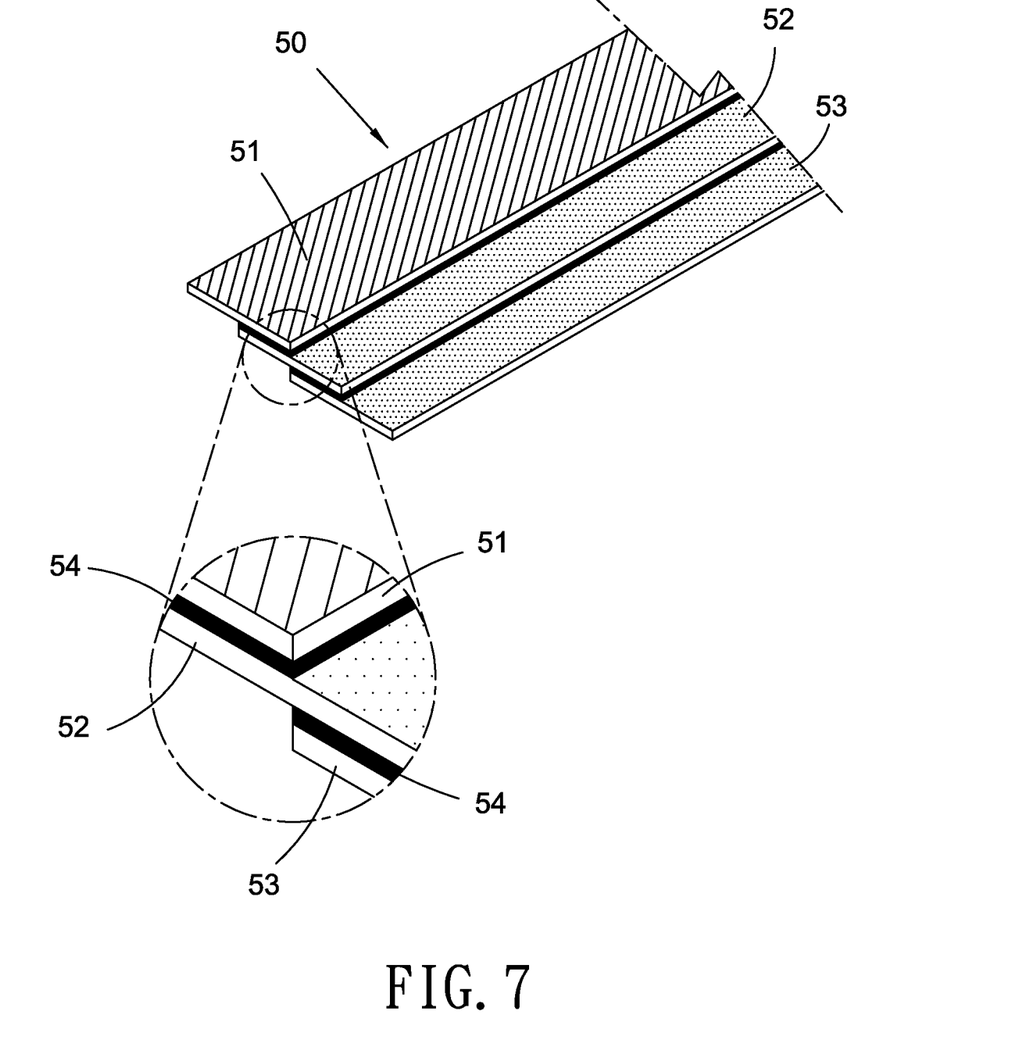
FIG. 7 is a partially schematic view of the invention, which shows the three-layer structure of the paper tube with a spiral structure.

Preferably, the bendable tube 10, 10A has a tube wall with at least two layers. More preferably, a three-layer tube wall is used. FIG. 5 shows a two-layer paper strip structure 40 of the paper tube with a spiral structure. FIG. 7 shows a three-layer paper strip structure of the paper tube with a spiral structure.

Figure 6:
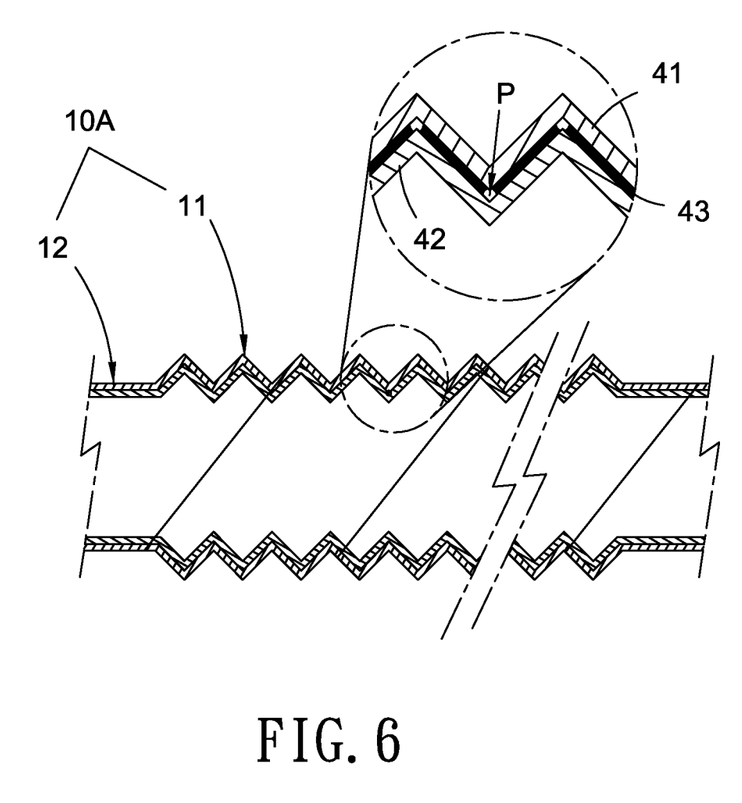
FIG. 6 is a cross section of an embodiment of the bendable tube of the invention.

Please refer to FIG. 5. The bendable tube 10, 10A is formed by a two-layer paper strip 40. The two-layer paper strip 40 is made by two strips of raw paper 41, 42 which are overlapped. The two strips of raw paper 41, 42 are adhered by an adhesive 43 to form the two-layer paper strip 40. The material of the raw paper 41, 42 may be traditional pulp, recycled paper or stone paper. Traditional pulp is preferred. The bendable tube 10, 10A is made by spirally winding the two-layer paper strip 40 to form a paper tube with a spiral structure and then forming the bendable tube 10, 10A by means of a dedicated machine or device. Before the adhesive 43 has hardened, the dedicated machine rolls the whole or a part length of the paper tube by the rolling process to form the bellows 11, and then the bellows 11 is pressed and stretched to make the adhesive 43 of its continuous waved folds broken at a turning position P as shown in FIG. 6. The rest of the adhesive 41, 42 for bonding the raw paper 41, 42 completely hardens to make the continuous waved folds of the bellows 11 be shaped with stretchability.

The above method for manufacturing the bendable tube 10, 10A with the bellows 11 by using the two-layer paper strip 40 is also available to the three-layer paper strip 50 shown in FIG. 7. The difference is that the three-layer paper strip 50 is made by three strips of raw paper 51, 52, 53 which are overlapped. The three strips of raw paper 51, 52, 53 are adhered by an adhesive 54 to form the three-layer paper strip 50. The bendable tube 10, 10A formed by the three-layer paper strip has a three-layer tube wall. The material of the raw paper 51, 52, 53 may be traditional pulp, recycled paper or stone paper. Traditional pulp is preferred.

Figure 8:
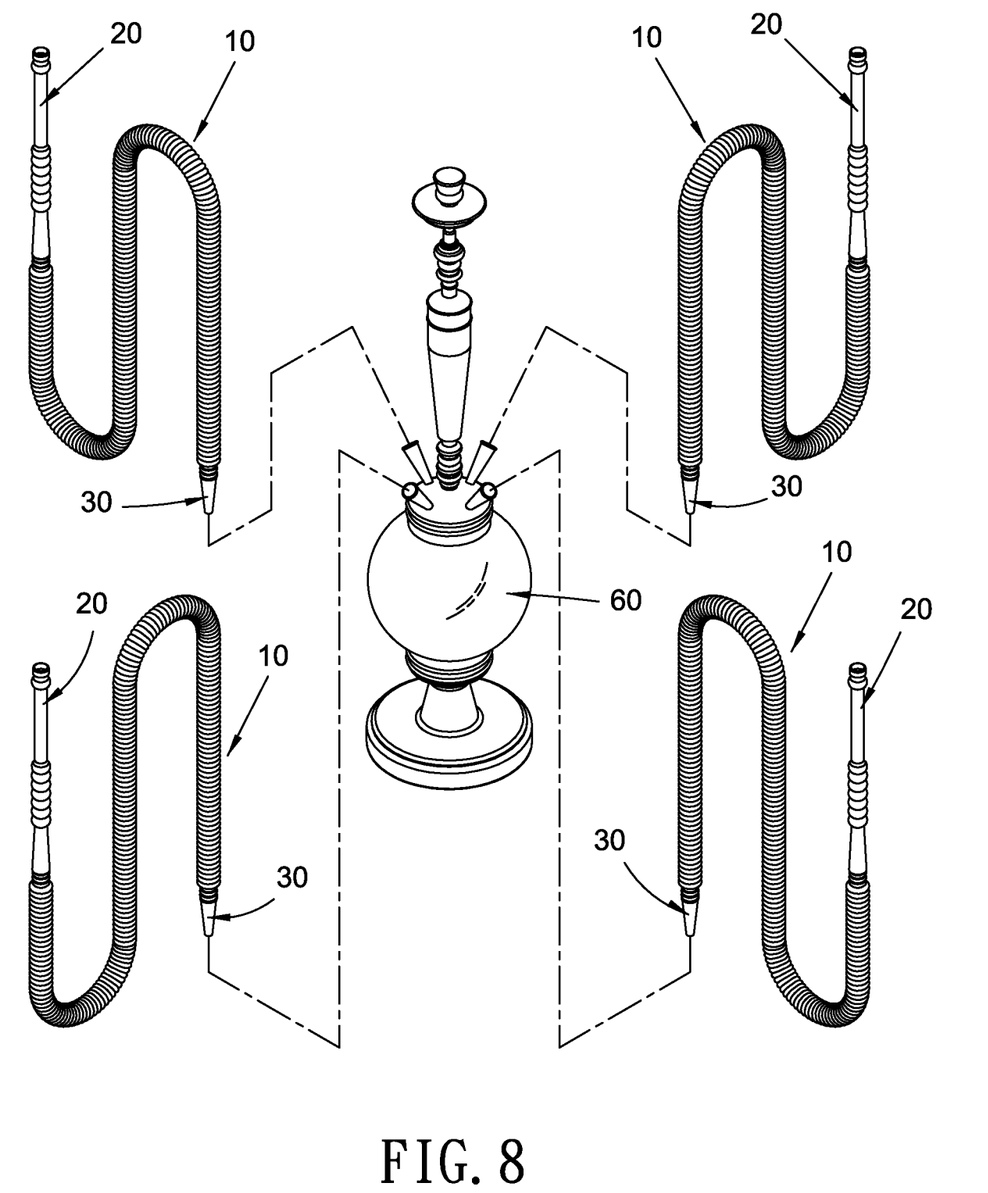
FIG. 8 is a schematic view of the paper hookah hose of the invention in use.

Please refer to FIG. 8, which is a schematic view of the paper hookah hose of the invention in use. When using the paper hookah hose of the invention, as general plastic hookah hoses on the market, just plug the connecting tube 30 into the kettle body 60 and it can be used. The connecting tube 30 is removable. Replacing the paper hookah hose only needs to unplug the connecting tube 30 and replug a new one.

What is claimed is:

1. A hookah comprising:
   a kettle body; and
   a replaceable paper hookah hose comprising:
      a bendable tube (10), being a tubular member made of paper and having at least two layers and a spiral structure, and having a section of bellows (11) for bending;
      a smoking mouth (20) adapted for a user to smoke from the hookah, made of traditional pulp, being a tubular member, and connected to an end of the bendable tube (10); and
      a connecting tube (30) adapted to plug into the kettle body of the hookah, made of traditional pulp, being a tubular member, and connected to another end of the bendable tube (10).

2. The hookah of claim 1, wherein the bendable tube (10) is a tubular member formed by a two-layer paper strip (40) by means of spiral winding.

3. The hookah of claim 2, wherein the two-layer paper strip (40) is made by two strips of raw paper (41, 42) which are overlapped, the two strips of raw paper (41, 42) are adhered by an adhesive (43) to form the two-layer paper strip (40), and material of the raw paper (41, 42) is traditional pulp, recycled paper or stone paper.

4. The hookah of claim 1, wherein the bendable tube (10) is a tubular member formed by a three-layer paper strip (50) by means of spiral winding.

5. The hookah of claim 4, wherein the three-layer paper strip (50) is made by three strips of raw paper (51, 52, 53) which are overlapped, the two strips of raw paper (51, 52, 53) are adhered by an adhesive (54) to form the three-layer paper strip (50), and material of the raw paper (51, 52, 53) is traditional pulp, recycled paper or stone paper.

6. The hookah of claim 1, wherein the bendable tube (10) is completely of a bellows (11).

7. The hookah claim 1, wherein the bendable tube (10) comprises at least one section of the bellows (11) and a section of straight tube (12) connected to the bellows (11).

8. The hookah of claim 1, wherein a tail section (21) of the smoking mouth (200) and a tail section (31) of the connecting tube (30) are separately inserted into two ends of the bendable tube (10) and are adhered to the bendable tube (10) by an adhesive.

* * * * *